Jan. 18, 1966   F. KUYT   3,229,669
RECORDER PEN
Filed March 17, 1964

INVENTOR.
FRITS KUYT
BY Frank C. Parker
David E. Dougherty
ATTORNEYS 3,229,669
RECORDER PEN
Frits Kuyt, Rochester, N.Y., assignor to Bausch & Lomb, Incorporated, Rochester, N.Y., a corporation of New York
Filed Mar. 17, 1964, Ser. No. 352,597
4 Claims. (Cl. 120—42.06)

This invention relates to a novel recorder pen of the type used in strip chart recorders.

Strip chart recorders have come into wide spread use in conjunction with electrical test equipment. Recorders of this type are responsive to frequent changes indicated by the electrical equipment. These changes are often rapid and require a pen to move a relatively long distance in a relatively short interval of time. At other times the pen is moved over a comparatively lesser distance during a similar time interval. Frequently a pen is temporarily withdrawn from use which may cause the ink to dry in the point. Such hardening impedes the flow of ink when the pen is returned to service. It is desirable therefore to have a pen wherein the flow of ink is responsive to rapid changes and thereby will produce a relatively uniform line notwithstanding relatively large changes in the rate of movement.

One approach which has had relatively wide spread commercial acceptance is disclosed in the United States patent of Sherman Gauley No. 3,094,104. The pens disclosed therein incorporate an integral spring needle which passes through and protrudes slightly beyond a writing tube. This feature overcomes to a high degree the problem of ink drying on the pen point during periods of nonuse. The spring needle moves axially within the stylus or outer tube to provide an ink flow when the point is brought into contact with a surface. There is also a small degree of lateral movement of the needle within the outer tube which enhances the response of the pen even though the pen remains in contact with the strip chart during periods of nonuse.

A recorder pen according to the present invention represents an improvement over the aforementioned devices. The pens produce a relatively even line notwithstanding large changes in the rate of movement. The configuration permits operation through a 90° change of attitude. The needle exhausts the ink supply, and venting below the ink level is maintained in either, or any intermediate position. This latter feature facilitates the production of a portable unit. Accordingly the novel pens disclosed herein incorporate a feature which tends to minimize the possibility of spilling the ink during movement of the device.

The novel pen disclosed herein includes a self-contained ink supply and may be readily refilled from an ordinary supply of link. The tendency for ink to run out of the pen during filling has been further minimized. It is presently thought for example that the use of a non-wettable plastic material such as polypropylene in the body of the pen contributes to overcoming this problem and also tends to minimize the cost of the pen. It is also desirable to construct the reservoir top of the same material to facilitate sealing the top to the reservoir.

The most significant feature incorporated in the novel pens according to the present invention relate to the improved construction which facilitates filling the pen while minimizing the adverse problems of ink spillage which had been associated with the prior art devices. These improvements have been obtained without sacrificing the many advantages associated with the aforementioned prior art pens and without any substantial increase in cost.

Briefly, a recorder pen according to the present invention includes means defining a reservoir having a shape generally similar to a rectangular box for containing a supply of ink. A vent tube extends through the top of the reservoir at the rear portion thereof. The opposite end of the vent tube is disposed in the forward lower portion in the proximity of the point. A feed tube or stylus generally similar to a hypodermic needle extends through the forward portion of the base of the reservoir. An annular wall extends upwardly from the inner surface of the base portion of the reservoir. The wall is located between one end of the vent tube and the point. The annular wall is in coaxial alignment with the feed tube and has a generally cylindrical shape circumscribing the feed tube; however, it includes means defining a longitudinal opening which allows ink to flow to the feed tube.

A spring needle includes a spiral spring portion and a straight portion. The straight portion extends through the feed tube and the spring extends upwardly therefrom and rests against the top of the reservoir. The straight portion extends through the feed tube and when a slight force is exerted on the extended portion it is pushed upwardly into the feed tube. The top of the reservoir is sealed to the reservoir by means of induction heating. Accordingly a metal spacer is disposed between the top portion of the reservoir and a mating portion of the top. The plastic in the area around the metal spacer is heated to thereby seal the top of the reservoir to the reservoir. The top also includes a closing member which is connected to the top by an integral strap hinge. The closing member also includes a projection for receivably engaging the spiral spring.

The invention will now be described in more detail in connection with the accompanying drawing, in which.

Figure 2:
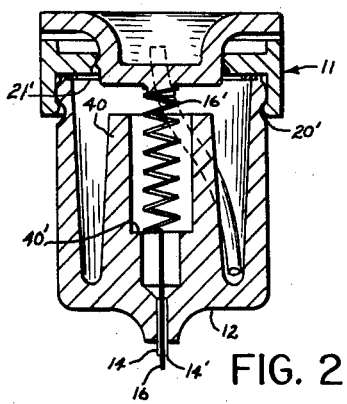
FIG. 2 is a cross sectional view taken along the line 2—2 of FIG. 1.
Figure 3:
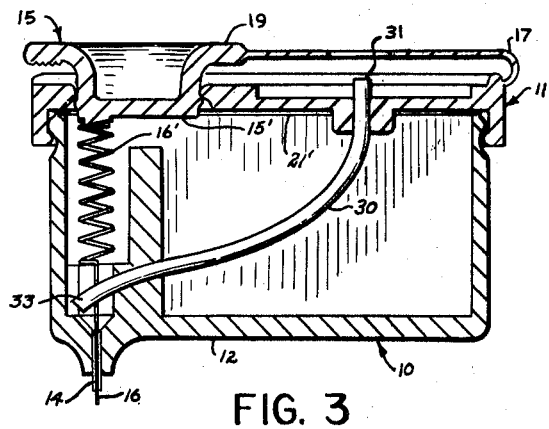
FIG. 3 is a fragmentary cross sectional view taken along the line 3—3 of FIG. 1
Figure 1:
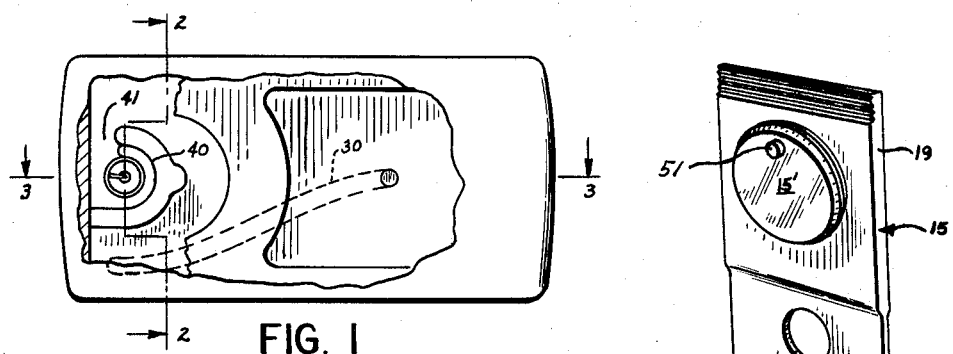
FIG. 1 is a top elevation view partly broken away of a recorder pen according to the invention.
Figure 4:
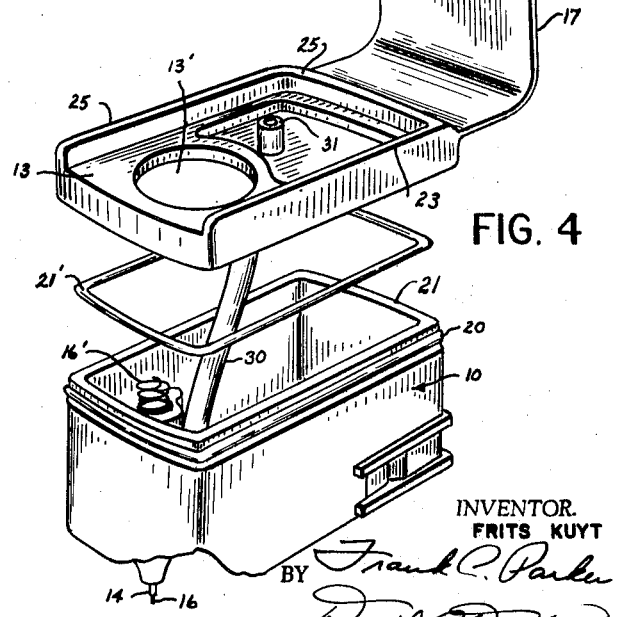
FIG. 4 is an exploded perspective view of the recorder pen shown in FIGS. 1–3.

A recorder pen according to the invention comprises a reservoir 10 having a shape generally similar to a rectangular box. The reservoir 10 is constructed by molding a non-wettable plastic compound such as polypropylene or polyethylene. The use of a non-wettable plastic compound for molding the reservoir tends to overcome a problem associated with ink running out of the pen point during the filling operation.

A top 11 includes a major portion 13 and a cap portion 15 which is connected to the major portion 13 by means of an integral strap hinge 17. The cap portion 15 includes an enlarged or thicker section 19 together with a round cap 15'. The major portion 13 defines a round opening 13' which is adapted to receive the cap 15' to thereby form a seal. Preferably the cap 15' is slightly larger than the opening 13' so that there is a relatively snug leakproof fit. The cap 15 also includes a small projection 21.

The major portion 13 of the top also defines a recess 23 which has a generally rectangular shape and upwardly extending flanges 25 surrounds three sides of the top. The flanges 25 together with recess 23 are adapted to prevent any spilled ink from running over the sides or back of the pen. Accordingly the ink may be confined to one area to thereby overcome problems associated with ink spillage.

A hollow needle 14 forms the stylus of the pen and extends through a base 12 of the reservoir 10. A pin 16 extends through the needle 14 in approximately axial alignment with the needle 14. The pin 16 includes an integral coil spring 16' disposed within the reservoir. The spring 16' engages the cap 15' when the cap 15' is in a closed position. The projection 51 tends to position the spring portion 16' of the pin 16. The projection 51 is for example disposed above the needle 14 and is in approximate alignment therewith when the cap 15' is in the closed position. The spring portion 16' biases the pin 16 through the needle 14. The pin 16 in its fully extended position extends approximately .015" past the end 14' of the needle 14.

A vent tube 30 is disposed within the reservoir. One end 31 of the vent tube 30 is fitted into an opening at the major portion 13 of the top 11. This opening passes through the recess 23 at approximately the middle thereof. The other end 23 of the vent tube is located at the bottom of the reservoir, whether the pen is operated in the normal (upright) position, or tilted 90°, to place the stylus horizontal and the vent at the top. If any ink is forced upwardly through the vent tube 30 it will fall into the recess 23 and be contained therein as long as the pen is in its normal or horizontal operating position.

An annular wall 40 defining a longitudinal slot 41 extends upwardly from the base 12 within the interior of the reservoir 10. The annular wall 40 separates the end portion 31' of the vent tube 30 from the needle 14. The slot 41 which is located on the side of the reservoir opposite the vent tube 30 allows ink to flow through it and into the needle 14. The annular wall 40 has a shape generally similar to a right circular cylinder and is in approximate coaxial alignment with the needle 14. The wall 40 acts as a spring retainer for the coil spring 16' which is fitted inside the annular wall 40. A shoulder 40' acts as a stop for the spring portion 16'.

The top 11 which is also preferably molded of the same plastic material as the reservoir may in some cases include fastening means such as a continuous bead 20' running around the periphery of the major portion 12 of the top 11 inside a flange. A corresponding bead 20 exists on the outside periphery of the reservoir. The dimensions of these beads 20 and 20' are such that tension is developed in the assembly, causing a sealing portion 21 of the reservoir to press a flat metal washer 21' against a flat portion of the top 11. After assembling the top 11 onto the reservoir the metal washer 21' is heated by induction heating to thereby soften or melt the plastic and permanently seal the top 11 to the reservoir. This seal is effective notwithstanding the attitude of the pen, or pressure during refilling.

In operation ink flows from the reservoir through the slot 41, and through the needle 14 to a chart (not shown). The ink flow is caused by capillary action since the area between the needle 14 and the pin 16 is generally similar to a capillary tube. The instant starting or self-priming qualities are enhanced by the presence of the needle 14. The spring portion 16' biases the pin 16 through the needle 14 however, the bias is overcome by the pressure of the pen on a chart. The movement of the pen across the chart also tends to produce a small lateral movement which enhances the ink flow.

In the preferred embodiment this lateral movement has a magnitude of approximately .003" since the outer tube has an inner diameter of approximately .008" diameter and the needle has an outside diameter of approximately .005". The needle 14 and pin 16 according to the preferred embodiment are manufactured of stainless steel in order to prevent corrosion thereof.

What is claimed is:

1. A recorder pen comprising means consisting essentially of non-wettable plastic material defining a generally box shaped reservoir for holding a supply of ink, a hollow needle extending through a base portion of said reservoir defining means, a top of said reservoir including a major portion defining an opening therein and having a downwardly extending flange adapted to fit over the upwardly extending sidewalls of said reservoir and seal said top to the sidewalls and a capping portion adapted to close the opening defined by said major portion, an integral strap connecting said capping portion and said major portion, a metal washer disposed between a portion of said major portion and the upwardly extending sidewalls to thereby facilitate sealing said top to said reservoir by means of induction heating, a vent tube extending through said major portion of said top with a second end of said vent tube disposed within said reservoir relatively close to an inner portion of said hollow needle, an integral pin coil spring unit, the spring portion of said unit biasing the pin portion through said hollow needle in a direction away from said reservoir whereby movement of said pin within said tube improves the flow of ink to the point of the pen, an upwardly extending annular wall defining a slot disposed within said reservoir positioning said spring within said reservoir.

2. A recorder pen according to claim 1 in which the cap includes a projection to further position the spring within said reservoir and the cap portion abuts said opening to thereby bias the pin through the needle when the cap is in a closed position.

3. A recorder pen according to claim 1 in which the major portion of the top defines a recess and the vent tube extends upwardly through the top and into the recess whereby minor quantities of ink forced through the vent tube will remain in the recessed portion.

4. A recorder pen according to claim 3 in which the top member includes an upwardly extending flange surrounding three sides of the top.

References Cited by the Examiner
UNITED STATES PATENTS

| | | | |
|---|---|---|---|
| 3,090,357 | 5/1963 | Gauley | 120—42.06 |
| 3,094,104 | 6/1963 | Gauley | 120—42.06 |

EUGENE R. CAPOZIO, *Primary Examiner.*

LAWRENCE CHARLES, *Examiner.*